May 15, 1928.

L. W. LANGFORD 1,669,766

SALES RECORDING METHOD AND MACHINE

Filed Dec. 23, 1924

INVENTOR
LEONARD W. LANGFORD
BY
White Prost + Evans
his ATTORNEYS.

May 15, 1928.

L. W. LANGFORD 1,669,766

SALES RECORDING METHOD AND MACHINE

Filed Dec. 23, 1924 4 Sheets-Sheet 2

INVENTOR
LEONARD W. LANGFORD his ATTORNEYS

May 15, 1928.

L. W. LANGFORD 1,669,766

SALES RECORDING METHOD AND MACHINE

Filed Dec. 23, 1924

INVENTOR
LEONARD W. LANGFORD his ATTORNEYS

May 15, 1928.

L. W. LANGFORD

1,669,766

SALES RECORDING METHOD AND MACHINE

Filed Dec. 23, 1924   4 Sheets-Sheet 4

INVENTOR
LEONARD W. LANGFORD his ATTORNEYS

Patented May 15, 1928.

1,669,766

UNITED STATES PATENT OFFICE.

LEONARD W. LANGFORD, OF SAN FRANCISCO, CALIFORNIA.

SALES-RECORDING METHOD AND MACHINE.

Application filed December 23, 1924. Serial No. 757,697.

This invention relates to an improved sales recording method and machine generally disclosed in my co-pending application Serial No. 666,255, filed October 3, 1923.

In the recording of sales made in department and other retail stores, it is now common practice for the clerk or other salesman to write out each order or sale on a separate sales slip which is of such a character or is so supported that one or more duplicate copies are made by suitable carbon interleaves or surfaces. One copy is generally delivered with the goods and another copy is retained by the salesman until such time as it is collected by or delivered to the auditing, bookkeeping or other department for use in tabulating the daily sales, making up the ledgers and the bills of the charge customers, or for other purposes. Of course the practice differs in different stores, depending upon the size of the store and the bookkeeping, auditing and billing system employed.

In order that the manager or proprietor may have an accurate record of each day's transactions, it is necessary for a staff of clerks to copy off the totals of all of the sales slips and tabulate them to show the information desired, as for instance, cash sales as handled by each cashier; total cash, C. O. D., and charge sales of each clerk, of each department, and of the entire store. In large stores it is not possible to obtain these figures for each day at the opening of business on the following morning unless a large staff is employed at night work, and then such figures are quite often inaccurate, due to mistakes in copying.

There is a double source of error in the system commonly employed wherein the clerk copies his several sales slip totals on a separate sheet in the back of his sales book and the auditing department copies them from these sheets. Faint, indistinct, or poorly formed figures are another source of error in securing the data as to the day's transactions. The expense of such tabulation by clerks working at night runs very high in large stores, and in any event forms a very considerable part of the overhead.

In some of the largest stores the method now employed includes the making of punched record cards from the sales slips. These cards are made on punching machines in the main office by a corps of punch operators. Ordinarily the punch operators make these punched record cards from the sales slips of the previous day's sales on the day following the sales transactions. The punched cards are thereafter sorted in accordance with the character of the transactions, such as "Cash", "C. O. D.", and "Charge" sales; in accordance with departments, etc. The sorted groups of cards are then run through a tabulating machine which totals and records the transactions. It will be obvious that such a method involves considerable labor, many chances for errors and great delay and inconvenience in obtaining the final results.

The primary object of my invention is to provide an improved method of sales recording and accounting wherein all the desired records and data are secured with greater accuracy in a greatly reduced amount of time and with far less labor and expense than has been necessary heretofore. Through the use of punched records formed in accordance with my invention one tabulating machine and one operator can obtain in a very short time the results which would otherwise require the services of a large staff of clerks or bookkeepers. It will of course be understood that my improved method is capable of considerable variation and may be carried out by various machines other than that illustrated herein, examples of such other machines being disclosed in co-pending applications Serial No. 51,297 filed August 20, 1925, and Serial No. 220,243 filed September 17, 1927.

Another object of the invention is the provision of a machine with which data concerning a sale of merchandise may be recorded by both manual entry and machine entry; the items of manual entry being those of name, address and similar items peculiar to each transaction and which must be legible in the ordinary sense of the word to customer and clerk alike; and the items of machine entry being such items of price, department, date and conditions of sale as are required for the proper auditing of the transaction.

Another object of the invention is the provision of a machine for the mechanical recordation of data concerning a sale of merchandise, in such form that such data may be classified and the transaction audited by other mechanical devices actuated and controlled by the sales ticket.

Another object of the invention is the provision of a machine for the recordation of data concerning a sale of merchandise in such form that the auditing of the sales transactions requires only a small part of the time and labor heretofore required.

Another object of the invention is the provision of mechanism of the sort described which materially reduces the possibility of fraudulent manipulation by the salesperson.

Another object of my invention is to provide a sales record machine wherein an autographic register has combined therewith a punch press on which can be set up a predetermined punching condition corresponding to the sale written on the sales ticket, means being provided for thereafter operating the punch press to perforate the main body of the ticket in accordance with the said set up condition and in a manner particularly adapting the ticket for use in mechanically and automatically auditing the sales.

My invention embodies other objects which together with the foregoing will be set forth in the following description of one means for practicing the invention and which is illustrated in the drawings accompanying and forming part of the specification. It is to be understood that I do not limit myself to the mechanism disclosed in the said description and drawings, as I may adopt variations thereof within the scope of my invention as set forth in the claims. It should furthermore be understood that while throughout this specification I refer to my invention as a sales recording method and machine the same is not to be understood as limited to the specific art of sales since obviously the invention is applicable in equal degree and in like manner to the recording and auditing of various records in various merchantile establishments, such for example as the art of billing railway shipments. Such analogous uses are obviously the equivalent of sales recording and auditing as disclosed and claimed herein.

Referring to the drawings.

The recording machine illustrated herein comprises a platen for supporting the sales record blank during manual entry of certain of the record items thereon and which may, as illustrated in the drawing, also function as a die plate during the machine entry or recordation of items. Means are provided for mounting a pack of fan-folded blank sales tickets in duplicate adjacent the platen, and a plurality of punches adapted to cooperate with the die plate are disposed in a frame above the platen. The frame is so arranged as to be movable away from the platen to clear the blank thereon so that record items may be written by the salesperson on the blank. The frame is also arranged to be moved laterally and during such movement to feed the filled-in blank to a point where it may be detached, and simultaneously draw a fresh blank into place over the platen. The plurality of punches in the frame are arranged so that they may be set for a subsequent coaction with the die plate and means are provided for actuating at one time, all of the punches previously set to represent a condition.

During the feeding forward of a fresh blank to the platen the original of the previously recorded blanks is moved to a position where it may be torn off against a shear edge, and the duplicate is moved into a locked compartment within the machine. When desired a cash drawer is provided with my recording mechanism and this cash drawer is controlled by a key mounted adjacent the punches. It is also optional to provide the machine with a credit authorization recording device comprising a punch similar to the other punches and the setting of which is effected by a solenoid energized through a circuit having a control switch in the office of the credit manager.

The punches with the exception of the credit authorization punch are arranged in two groups, the first group terminating on the upper portion of the machine in a bank of keys, in some degree resembling an adding machine. The keys are numbered or worded so that they may be readily selected by the salesperson, and pressed to the "set" position to indicate the amount and a condition of the sale. For example, if a sale is made amounting to $5.78 and this amount is to be charged to a customer whose credit is established, keys marked "five", "seven" and "eight" and "charge" are selected in the proper columns and depressed, the subsequent action of the machine punching holes in predetermined areas on the sales ticket lying on the platen. In the second group of punches are those relating to the date, department in which the sale takes place, and the clerk's number. These are preferably set up each day by one delegated to that duty, and are not within the direct control of the salesperson.

When a sale is made the salesperson moves the punch unit mechanism out of the way of the platen and writes certain items on the exposed sales ticket blank with a pencil. For example, the name of the purchaser and his address, the name and quantity of articles purchased and the price. The punch unit is then replaced over the blank and certain of the keys depressed to the "set" position, such for example as a key marked "Cash" or "C. O. D." and keys representing the price. The machine is now set to a condition, and by the movement of an appropriate lever the sales ticket and duplicate are punched in accordance with the setting, and also in accordance with the previously set punches recording the number of the department, the month, the day of the month, and the clerk number. Immediately following the punching of the blank, the punches are automatically released from set position and return to first position ready for a subsequent setting. Lateral reciprocation of the punch unit now advances the blanks one step leaving the original in position to be torn off and moving the duplicate into the locked compartment in the frame of the machine.

The original may take various forms but it is convenient to arrange it in two parts, part of which may then be torn off and handed to the customer and the other part pasted on the package as a means of identification and direction for the delivery department. By actual test the recordation of the above indicated data may be accomplished in about twenty-five seconds. This is to be compared to about one minute and fifteen seconds required for the manual entry of these items, many of which are repeated two or more times, on the sales tickets now commonly in use. At the close of the day the recorded duplicates are taken out of the machine and by the aid of suitable mechanism, desired audit records made, the perforated tickets acting as a record ribbon, and suitable electrical devices being controlled by contacts permitted through the punched apertures.

Figure 2:
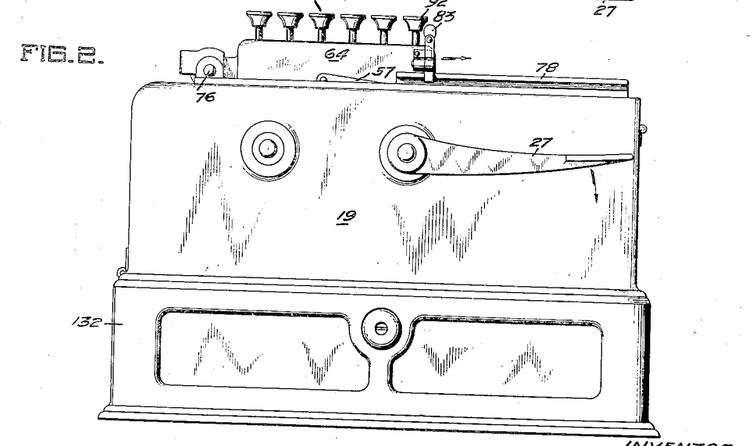
Figure 2 is a front elevation of the machine.
Figure 5:
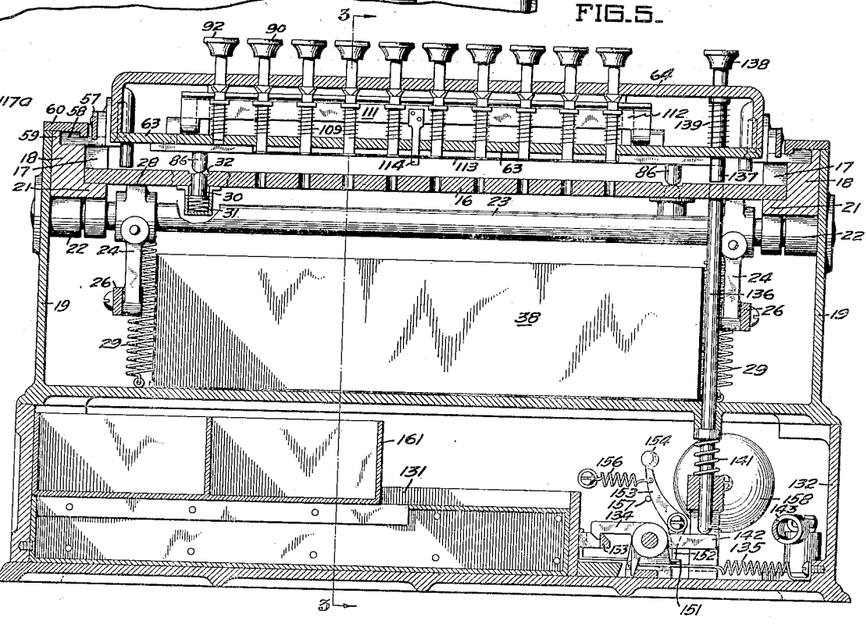
Fig. 5 is a vertical sectional view through the machine with the cash drawer included, the plane of section being indicated by the line 5—5 of Fig. 1.

In detail, my sales record machine illustrated herein comprises a platen or punch plate 16 mounted for vertical reciprocatory movement in a slide-way formed by the edges 17 on the bars 18 one of which is mounted on each side of the casing 19 comprising the body of the machine. At its lowermost point the platen 16 rests on the flanges 21 projecting horizontally inwardly from the bars 18 as shown in Fig. 5. Journaled in suitable bearings 22 arranged in the casing 19 are two parallel shafts 23 on which, at each end is fixed an arm 24. At each side of the machine the corresponding arms are connected by a link 26, so that the two shafts are operatively connected for synchronous movement. One of the shafts extends through the bearing to the exterior of the casing and is provided with an operating lever 27, Fig. 2, the depression of which rocks both shafts in equal degree.

Integrally formed with each of the arms 24 is a cam 28 and these four cams engage the under surface of the platen 16 adjacent its corners. The proportions and arrangement of the cams is such that depression of the operating lever 27 turns the cams against the under face of the platen and raises it vertically in its slide-ways a short distance. A spring 29 at each side of the platen resiliently retains the platen upon the cams during their operation.

Figure 3:
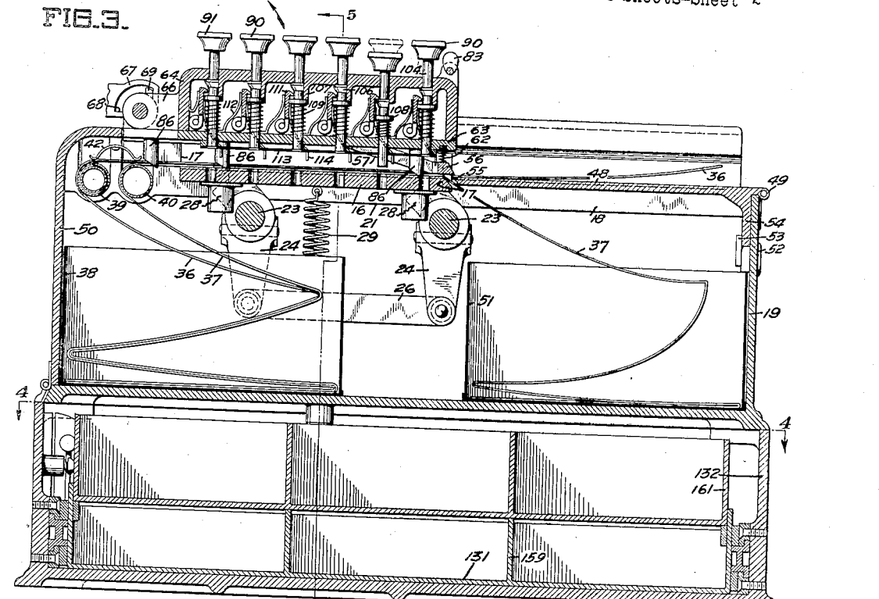
Fig. 3 is a vertical section through the machine and pedestal containing a cash drawer, the plane of section being indicated by the line 3—3 of Fig. 1.
Figure 4:
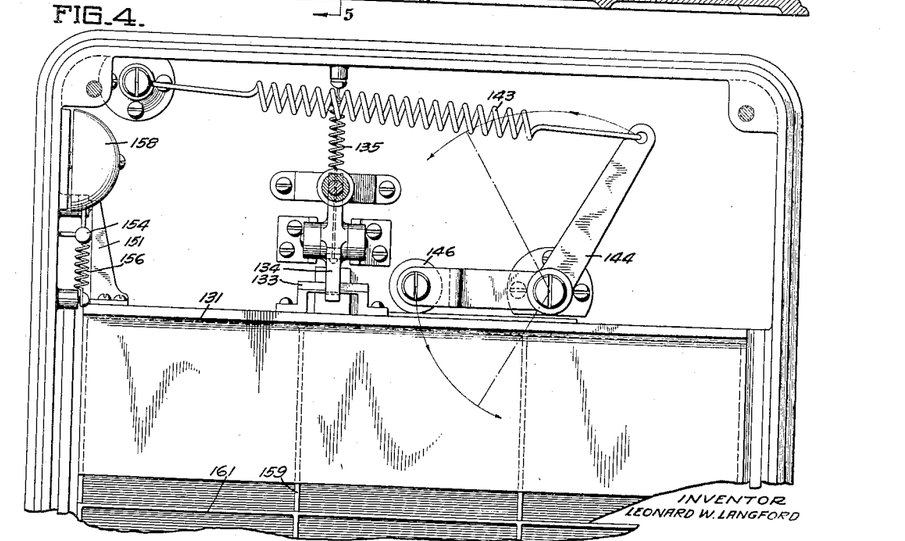
Fig. 4 is a plan view of a portion of the cash drawer alone, the plane in which the projection appears being indicated by the line 4—4 of Fig. 3.

Arranged on each side of the platen as viewed in Fig. 5 are two spaced pins 30 having beveled upper ends and each pressed upwardly by a spring 31. These pins are arranged to emerge from the upper face of the platen in a shallow groove 32 and their function is to position, on the platen, the blank sales ticket 33 shown in Fig. 11, such blank being provided with holes 34 in which the pins engage. The blanks form part of a strip 36 which is given a fan-fold as shown in Fig. 3. The strips are arranged in pairs the original 36, and the duplicate 37, being folded together, and the pack deposited in a compartment 38 in the body of the machine. From the compartment the two blanks pass over fixed rolls 39 and 40 respectively and are gently pressed against the rolls by the spring 42 to provide the required resistance for proper operation. As shown in Fig. 12, the roll 39 comprises an outer tube having a slot 43 therein. Fitting snugly within this outer tube is a second tube 44 having a slot 46. A piece of carbon paper 47 formed on a durable base is inserted between the two alined slots and the inner tube then turned to lock the paper in position.

The carbon paper extends between the two blanks across the platen of the machine and transfers to the duplicate, any record written on the face of the original. Access to the compartment 38 is provided by the hinged lid or wall 50.

From the platen, the original or upper blank feeds across the top plate 48 comprising a lid mounted on the hinges 49 and closing one side of the casing in which a receptacle 51 for the recorded duplicate blanks is arranged. To prevent unauthorized access to the duplicate blanks, a barrel lock 52 is arranged in the wall of the casing, and provided with a bolt or arm 53 of the usual type adapted, in the locked position, to overlie the arm 54 fixed upon the lid, so that when the lock is set the lid cannot be opened. When closed, the lid lies upon the ledges formed by the bars 18, and its free edge is spaced a short distance from the edge of the platen, so as to provide a slit 55 thru which the duplicate sales tickets pass to the receptacle 51. To facilitate tearing the original ticket from the strip of tickets a shear edge 56 is provided in such position that when the filled-in tickets have been fed forward to move the duplicate into the receptacle 51, the original may be grasped and torn off. The shear is mounted on a pair of arms 57 pivotally mounted on a carriage comprising chiefly the slides 58, one of which is arranged on each side of the machine in a slide-way formed by the flange 59 of the bar 18, and a cover plate 60 overlying such flange, as best shown in Fig. 5. Stops 61 at each end of the slide-way limit the reciprocatory movement of the carriage.

The shear is resiliently pressed downwardly against the blanks by springs 62 interposed between the shear and the punch guide plate 63, forming the base or bottom of the frame or punch head 64 in which the punches are mounted. The frame is pivotally mounted by means of the lugs 66 on the carriage members 58, so that the frame and its contents may be raised free of the platen to give access thereto for the manual entry of items on the blank.

The carriage slides 58 are provided with housings 67 of peculiar shape as shown in Fig. 3, so as to provide a stop 68 against which the pin 69 engages to limit the upward movement of the frame. One of the housings 67 is extended around the lug 66 to provide a seat 71 having a series of recesses disposed in a circle thereon, such recesses being adapted to receive pins 72 fixed on a disk 73 to which is fastened one end of a spring 74 surrounding the rod 76 which forms the pivot pin for the mounting of the frame. The opposite end of the spring is fixed to the opposite lug 66. The disk 73 is adjusted on its seat to place the spring under the proper tension to counter-balance the weight of the frame so that it may be more easily lifted free of the platen, and so that danger of injury to the machine by dropping the frame is eliminated.

Figure 1:
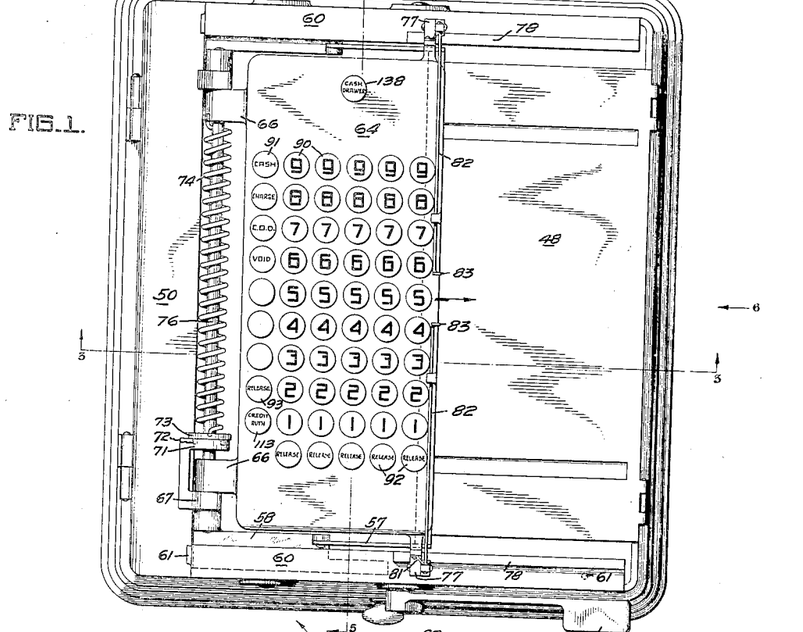
Figure 1 is a plan view of my sales recording machine.
Figure 6:
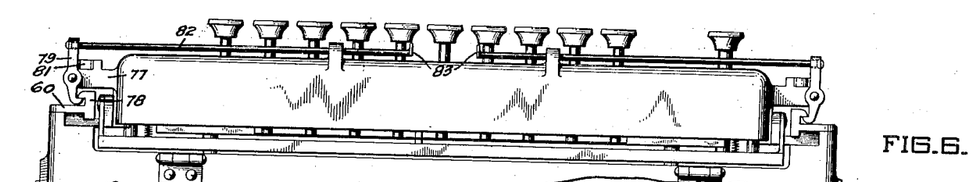
Fig. 6 is a fragmentary elevation of the recording machine alone, the direction of the view being indicated by the arrow 6 in Fig. 1.

The free end of the frame as shown in Fig. 1 is provided with lugs 77 overlying and resting on the flange 78 on the cover plate 60. On each of the lugs 77 is a latch 79 adapted to hook under the flange 78 as best shown in Fig. 6. Springs 81 resiliently retain the latches in engaged position. Connected to the opposite end of the latches are alined rods 82, provided at their adjacent ends with grips 83, close enough together so that they may be caught between the thumb and finger and pressed together to release the latches to permit the frame to be raised. It will be noted that the form of the latch does not prevent lateral movement of the frame with the carriage members 58, and the extent of the flanges 78 is such as to engage the latches at all points during the reciprocatory lateral movement of the frame bearing the punches. The latches are necessary to prevent undesired raising of the punch carrying frame during the punching of the blanks and during the lateral movement of the frame to move a fresh blank into position on the platen.

Fixed in the punch guide plate 63 are pins 86 alined with the pins 30 in the position of the parts shown in Figs 1, 3 and 5. When so alined the lower spring-pressed pins 30 are depressed and the apertures 34 in the blank are engaged by the pins 86. It will be noted that these pins extend closely adjacent to the bottom of the grooves 32 and therefore extend a short distance through the sales tickets on the platen. Preferably there are three such pins on each side of the punch guide plate and when the frame 64 is moved laterally these pins carry the sales tickets with it. On the recovery or backward movement of the frame 64, the beveled ends of the pins permit the paper to press down below them, the paper being held from backward movement by the spring-pressed pins 30 which move upwardly to engage in the apertures 34 of the blank as the blank is drawn forwardly over the platen. It will be seen from this that the punch-carrying frame also functions as a feed mechanism; movement to the right of Figs. 1 and 3 carrying the sales tickets forward one step, advancing the original to exposed position on top of the lid 48 where it may be torn off following the recovery movement of the frame, and advancing the duplicate into the locked compartment below the lid 48.

Punches are arranged in the frame 64, and mechanism is provided whereby these punches may be set to represent a condition characterizing the sale to be recorded. Means are also provided for releasing the punches from set position so that any error in setting may be corrected. After the punches have been set, then movement of the actuating lever 27 forces the die plate 16 upwardly against the punches thus effecting the perforation of the record blank in the selected areas.

As already indicated the punches are in two groups, the first group comprising punches actuated to record the price of the article sold and a condition of the sale. These punches are arranged as shown in Figs. 1 and 3 and are capped by numbered keys 90, or by keys 91 bearing words. Preferably there are five punches of each denomination from 1 to 9 after the well-known arrangement of adding machine keys, and each of the groups of punches numbered from one to nine is associated with a release mechanism controlled by a key 92 for releasing any punch set in error.

The release means and the punches may be arranged in accordance with well-known practice and each conveniently comprises a shaft 104 having a flange 106, flattened on one side, to engage a flange 107 on the frame, to prevent rotation of the shaft. The release shaft is shorter than the punch shafts, but otherwise the structure is similar. The lower end of each punch extends through the punch guide plate 63, between which and a flange 108 on the shaft, is a spring 109 resiliently pressing the punch toward its upper position with the flange 108 against the flange 107. A latch bar 111 pivoted within the frame extends along each group of numbered key punches and springs 112 press the latch bars toward the shafts, so that when any key is depressed, its flange 106 is caught and the punch held by the latch in the "set" position, as shown in Fig. 3. Obviously the depression of any key will release any previously depressed shaft in that particular group. Underlying the punch guide plate is a stripper plate 113 to insure the freeing of the punches from the sales tickets. An arm 114 attached at its upper end to each latch bar is arranged in such position as to engage the platen immediately following the punching of the blanks so that when the operating lever 27 is released and the platen returns to its lower position all of the keys have been released ready for a subsequent setting.

Besides the numbered keys 90 are the keys 91, bearing words such as "Cash", "Charge", "C. O. D." and "Void", or representing any other condition of which it may be desired to make a record. Each one of the shafts associated with these keys, when depressed, is in position to cause a perforation of the sales ticket blank as a permanent record of the given fact. A release mechanism capped by the key 93 is associated with the keys 91.

Figure 7:
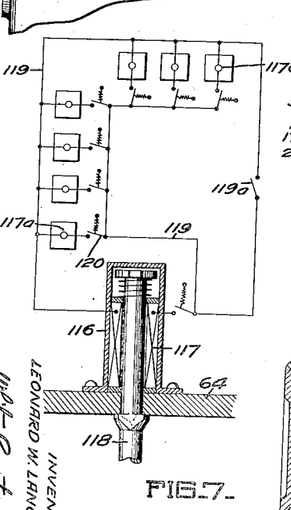
Fig. 7 is a vertical sectional view through the solenoid-controlled credit authorization punch, and showing in diagram the connected circuits.

In many cases it is necessary to refer the matter of credit to the official in the organization having charge of this work, and means are provided for the control of the credit authorization punch from the central office. Arranged on the frame 64 within the closed casing 116 is a solenoid 117 surrounding the shaft 118 of a punch similar to those already described. The solenoid is connected in parallel with the solenoids 117$^a$, Fig. 7 of other machines, in a circuit 119 running to the central office and having a control switch 119$^a$ there. Each solenoid is controlled by a spring-opened switch 120, which is normally open. When the credit standing of a customer is to be ascertained, the salesperson phones the credit manager and then closes the switch 120 on his machine, holding it closed for a moment, so that if the credit of the customer is found satisfactory, the closing of the switch 119$^a$ in the office of the credit manager energizes the solenoid controlled by the closed switch 120, and sets the punch 118 for operation. A latch and automatic release arm are provided for this punch, similar to the latch bar 111 and release arm 114 associated with the punches operated by the keys 90.

Figures 8, 11:
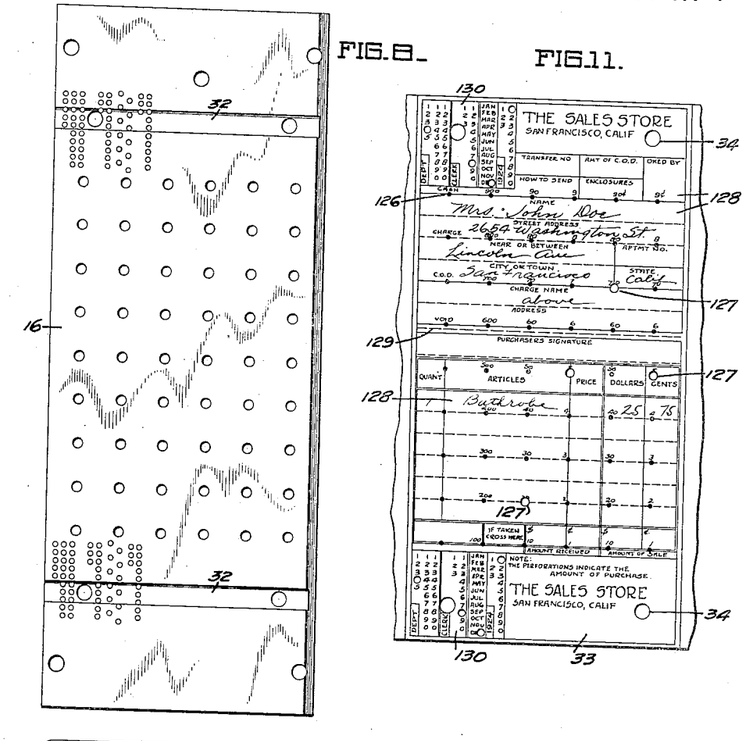
Fig. 8 is a plan view of the unmounted die plate or platen.
Fig. 11 is a fac-simile of the sales ticket showing the recordation of data thereon both by manual entry and machine punching.
Figures 9, 10, 12:
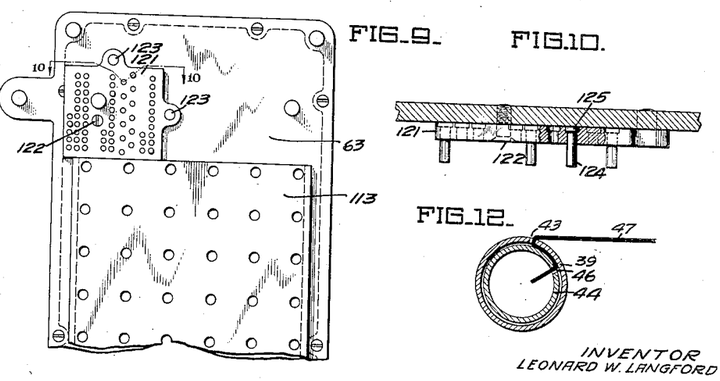
Fig. 9 is a bottom view of the punch guide plate and it also shows a bottom view of a portion of the mounting for the punches.
Fig. 10 is a vertical sectional view through a portion of the mounting of the punches the plane of section being indicated by the line 10—10 of Fig. 9.
Fig. 12 is a sectional view through the roll 39 showing the method of holding the carbon paper in position.

Means are provided for making a second series of perforations representing the department number, the clerk number and the date; and in the form of the sales ticket shown in Fig. 11, this record is entered in duplicate. It is preferable to fix these punches out of the control of the salesperson to prevent tampering or alteration or fradulent transactions. A convenient method is the provision of an apertured block 121 secured by the screw 122 to the under side of the punch guide plate 63 as shown in Fig. 9, and positioned thereon by means of pins 123. The punches are formed by short studs 124 arranged in selected apertures, and provided with heads 125, seating in recesses in the side of the plate next the punch guide plate 63. These punches are set by removing the punch block and inserting the punches 124 in the proper apertures. The block is locked in place and the punches locked in the block when the screw 122 is turned in. It is contemplated that this group of punches will be set up at the beginning of each day by one delegated for that duty.

A convenient sales ticket blank is shown in Fig. 11, in which the areas which may be punched are clearly marked by appropriate printing. For example, the areas 126 which will be punched by the "Void" or the "Cash" punch are marked with the words "Void" and "Cash" respectively, and the areas 127 which will be punched, for a sale of, say, $25.75, are marked with these figures respectively so that the punchings in the blank have a definite value to the observer apart from their value in the auditing machine. It will be also obvious that while a written sales tag might be altered, it is impossible to alter a tag in which the values are indicated by perforations as well as written characters. The areas perforated by the punches capped by the keys 90 and 91 exist on the sales ticket in the same relationship characterizing the spacing of the keys, and each area is labeled so that the significance of a punched aperture therein in the subsequent auditing of the sales ticket by automatic means, may be readily understood.

Between and adjacent the areas reserved for punched apertures are areas 128 in which other facts regarding the sale are entered manually by the salesperson. It will be noted that there is no duplication of such entries, as required in most sales tickets heretofore used, in which items are frequently entered in two or three different places.

As previously explained the original sales ticket is designed to be torn in two along the perforated line 129, the portion below the line being handed to the customer and the other portion being attached to the bundle, that is, the lower portion constitutes a customer's receipt or memorandum and the other portion constitutes a shipping tag. It is desirable that on both of these, the date, and the department and clerk numbers shall appear, and areas 130 in each portion of the original or upper sales ticket, are reserved for this purpose. These areas are suitably printed as shown, and apertures formed by the fixed punches 124, Fig. 10, provide the required contacts for automatic segregation in the auditing machine and at the same time permit visual interpretation of these factors.

In some cases it is desirable to incorporate a cash drawer with the recording machine and in Figs. 3 and 5 I have shown sectional views of machines so equipped. A cash drawer 131 is mounted on suitable slides in the base 132 adapted to underlie the housing 19 and to be secured thereto in any suitable way, such as by screws through alined lugs or flanges. The rear of the drawer is provided with a lug 133, adapted to be engaged by the latch 134, connected by the spring 135 with the rear wall of the base. The spring tends to retain the latch in position to hold the drawer from being opened as shown in Fig. 5. Mounted in the base and extending through the lower portion of the casing 19 is a shaft 136 terminating under a shaft 137, capped by a key 138, forming part of the bank of keys on the punch unit or frame. The shaft 137 is kept in its upper position by a spring 139 and the shaft 136 is retained in its upper position by the spring 141. Depression of the key 138 presses down the two alined shafts, and rocks the lever arm 142 secured to the latch 134, so as to release the latter and permit the spring 143 actuating the bell crank lever 144 one arm of which is provided with a roller 146 bearing against the rear of the drawer, to open the drawer.

Means are provided for causing the ringing of a bell when the drawer is opened to give notice of a cash transaction. Fixed on the rear of the drawer is a spring arm 151 having a hooked end adapted, when the drawer is pushed shut, to slide past and catch the lower end 152 of a lever 153, provided with a bell clapper 154 at its upper end and drawn by the spring against the stop 157. With the release of the latch 134 the drawer is moved suddenly by the spring 143 toward the open position, throwing the clapper over against and ringing the bell 158. Almost simultaneously, the spring arm 151 slips off the bottom of the arm 152 allowing the spring 156 to return the clapper lever against the stop. The drawer is provided with suitable compartments separated by the flanges 159 and is preferably also provided with a tray 161 which may be of any convenient arrangement.

From the above it will be clear that each clerk or salesperson in a store is provided with one of my machines, which as already explained includes devices for perforating the sales tickets in accordance with the conditions characterizing each sale, and also to identify each sales ticket with the individual handling the transaction and the department in which it occurs, and also to record other pertinent facts regarding the conditions of the sale, so that all necessary data is supplied in such form as to make possible the automatic auditing of the transaction in devices provided for that purpose.

At the time of the sale, the salesperson lifts the punch unit or frame 64 free of the platen 16 and writes on the sales ticket with a pencil the name and address of the customer, the name and quantity of the article purchased, and its price. The punch unit is then let down over the ticket and the suitable keys depressed to set up a condition, corresponding to the price of the article and the character of the transaction, after which the operating lever 27 is depressed to effect the punching of the superposed sales tickets.

The punch unit, now operating as a feed means, is moved to the right as far as it will go, and then returned to first position, leaving the two-part original ticket lying on the lid, ready to be torn off, and the duplicate in the locked compartment 51. It will be noted that the supply ends of the ticket strips are housed in fan-fold form in the compartment 38 from whence they extend over the platen. The other end of the bottom strip is received and retained in fan-fold strip form in the locked compartment 51 whereby the possibility of losing any of the tickets is entirely eliminated.

At the close of the day, the recorded tickets are collected and fed thru automatic devices for the segregation, classification and addition of the data indicated by the apertured areas thereon, so that a complete and accurate audit of all transactions occurring during the day is readily available within a short time after the close of the business day. An auditing machine for performing this function is disclosed in my application, Serial No. 45,461, filed July 23, 1925.

I claim:

1. A sales record machine comprising the combination of a body having a chamber therein, a platen thereon including a die for receiving and supporting a plurality of sales tickets in manifolded relation, a punch head on the body including a plurality of punches cooperating with the die, means for setting up a predetermined punching condition comprising varying combinations of the punches to punch varying desired definite sums and other related data, the arrangement being such that the operator can autographically record a sales transaction on the manifolded sales ticket and then set up the said punching condition to correspond thereto, means whereby the said ticket is then located between the punches and die, means for thereafter effecting a relative movement between the punch head and die to punch the ticket in a manner corresponding to the said punching condition and particularly adapting the same to be thereafter mechanically operated upon through the perforations therein to automatically record or secure data of the sales, and means for conducting one copy of each completed ticket into the chamber and retaining the same therein.

2. A sales record machine comprising the combination of a chambered body adapted to contain a supply of blank sales slips in strip form and to receive therein one copy of each of the completed slips, a platen thereon including a die for receiving and supporting a plurality of the sales strips in manifolded relation, a punch head on the body including a plurality of punches cooperating with the die, means for setting up a predetermined punching condition comprising varying combinations of the punches to punch varying desired definite sums and other related data, the arrangement being such that the operator can autographically record a sales transaction on the sales slip on the platen and then set up the said punching condition to correspond thereto, means for effecting a relative movement between the punch head and strips whereby to locate the autographed portion of the strips between the punches and die, means for thereafter effecting a relative movement between the punch head and die to punch the same in a manner corresponding to the said punching condition and particularly adapting the same to be thereafter mechanically operated upon through the perforations therein to automatically record or secure data of the sales, and means for conducting one copy of each completed slip into the machine and retaining the same therein.

3. A sales record machine comprising the combination of a chambered body adapted to contain a supply of blank sales slips in strip form and to receive therein one copy of each of the completed slips, a platen thereon including a die for receiving and supporting a plurality of the sales strips in manifolded relation, a punch head on the body including a plurality of punches cooperating with the die, means slidably mounting the punch head in a manner adapting movement of the same in one direction to feed the strips over the platen, means for setting up a predetermined punching condition comprising varying combinations of the punches to punch varying desired definite sums and other related data, the arrangement being such that the operator can autographically record a sales transaction on the sales slip on the platen and then set up the said punching condition to correspond thereto, means for thereafter effecting a relative movement between the punch head and die to punch the manifolded autographed ticket therebetween in a manner corresponding to the said punching condition and particularly adapting the same to be thereafter mechanically operated upon through the perforations therein to automatically record or secure data of the sales, and means for conducting one copy of each completed slip into the machine and retaining the same therein.

4. A sales record machine comprising the combination of a chambered body adapted to contain a supply of blank sales slips in strip form and to receive therein one copy of each of the completed slips, a platen thereon including a die for receiving and supporting a plurality of the sales strips in manifolded relation, a punch head on the body including a plurality of punches cooperating with the die, means slidably mounting the punch head in a manner adapting movement of the same in one direction to feed the strips over the platen, means to engage and hold the strips against backward movement upon return movement of the punch head, means for setting up a predetermined punching condition comprising varying combinations of the punches to punch varying desired definite sums and other related data, the arrangement being such that the operator can autographically record a sales transaction on the sales slips on the platen and then set up the said punching condition to correspond thereto, means for thereafter effecting a relative movement between the punch head and die to punch the manifolded autographed ticket therebetween in a manner corresponding to the said punching condition and particularly adapting the same to be thereafter mechanically operated upon through the perforations therein to automatically record or secure data of the sales, and means for conducting one copy of each completed slip into the machine and retaining the same therein.

5. A sales record machine comprising the combination of a chambered body adapted to contain a supply of blank sales slips in strip form and to receive therein one copy of each of the completed slips, a platen thereon including a die for receiving and supporting a plurality of the sales strips in manifolded relation, a punch head on the body including a plurality of punches cooperating with the die, means slidably mounting the punch head in a manner adapting movement of the same in one direction to feed the strips over the platen, means for consecutively engaging definitely spaced holes in the strips in a manner definitely regulating the amount of each feeding movement of the strips and lining up the strips and holding the same against backward movement upon the return movement of the punch head, means for setting up a predetermined punching condition comprising varying combinations of the punches to punch varying desired definite sums and other related data, the arrangement being such that the operator can autographically record a sales transaction on the sales slip on the platen and then set up the said punching condition to correspond thereto, means for thereafter effecting a relative movement between the punch head and die to punch the manifolded autographed ticket therebetween in a manner corresponding to the said punching condition and particularly adapting the same to be thereafter mechanically operated upon through the perforations therein to automatically record or secure data of the sales, and means for conducting one copy of each completed slip into the machine and retaining the same therein.

6. A sales record machine comprising the combination of a body having a chamber therein, a platen thereon including a die for receiving and supporting a plurality of sales tickets in manifolded relation, a punch head on the body including a plurality of punches cooperating with the die, means for setting up a predetermined punching condition comprising varying combinations of the punches to punch varying desired definite sums and other related data, the arrangement being such that the operator can autographically record a sales transaction on the manifolded sales ticket and then set up the said punching condition to correspond thereto, means pivotally mounting the punch head whereby the same may be moved from a position remote from the die to the punching position over the die with the manifolded autographed ticket located therebetween, means for thereafter effecting a relative movement between the punch head and die to punch the ticket in a manner corresponding to the said punching condition and particularly adapting the same to be thereafter mechanically operated upon through the perforations therein to automatically record or secure data of the sales, and means for conducting one copy of each completed ticket into the chamber and retaining the same therein.

7. A sales record machine comprising the combination of a chambered body adapted to contain a supply of blank sales slips in strip form and to receive therein one copy of each of the completed slips, a platen thereon including a die for receiving and supporting a plurality of the sales strips in manifolded relation, a punch head on the body including a plurality of punches cooperating with the die, means for setting up a predetermined punching condition comprising varying combinations of the punches to punch varying desired definite sums and other related data, the arrangement being such that the operator can autographically record a sales transaction on the sales slip on the platen and then set up the said punching condition to correspond thereto, means movably mounting the punch head whereby the same may be moved from a position exposing a slip of the strip for writing on the platen to the punching position over such slip, means for thereafter effecting a relative movement between the punch head and die to punch the same in a manner corresponding to the said punching condition and particularly adapting the same to be thereafter mechanically operated upon through the perforations therein to automatically record or secure data of the sales, and means for conducting one copy of each completed slip into the machine and retaining the same therein.

8. In a sales record machine, a platen for supporting a sales record blank during manual entry of record items comprising a die plate, a laterally movable carriage adjacent the platen, a frame arranged on said carriage and movable thereon from a position covering the die plate to a position exposing the die plate, a plurality of punches disposed in said frame, means for permitting the selective setting of said punches for subsequent coaction with the die plate, means for moving the die plate toward the frame to perforate the blank, and means effective during the movement of said carriage in one direction for feeding a fresh blank to the die plate.

9. In a sales record machine, a platen for supporting a sales record blank during manual entry of record items comprising a die plate, a frame movable from a position covering the die plate to a position exposing the die plate, a plurality of punches disposed in said frame, means for permitting the selective setting of said punches for subsequent coaction with the die plate, and means for moving the die plate toward the frame to perforate the blank.

10. In a sales record machine, a platen for supporting a sales record blank during manual entry of record items comprising a die plate, a movably mounted frame, a plurality of punches in said frame, means for permitting the selective setting of said punches for subsequent coaction with the die plate, means for moving the die plate toward the frame to perforate the blank, and means effective by the movement of said frame for feeding a fresh blank to the die plate.

11. In a sales record machine, punching mechanism for perforating a sales record blank in selected areas, part of said mechanism comprising a support for the blank during manual entry of record items thereon, and part of said mechanism being a punch head bodily movable to effect the feeding of the blanks across the support.

12. In a sales record machine, a platen for supporting a sales record blank during manual entry of record items comprising a die plate, a frame movable from a position covering the die plate to a position exposing the die plate, a plurality of punches disposed in said frame, means for permitting the selective setting of said punches for subsequent coaction with the die plate, and manually controlled cam mechanism for moving the die plate toward the frame to perforate the blank.

13. In a sales record machine, a platen for supporting a sales record blank during manual entry of record items comprising a die plate, a transversely movable frame, a plurality of punches in said frame, means in said frame adapted to engage holes in the blank on said die plate in a manner for feeding the blank during movement of the frame in one direction, and means for causing cooperative action between the punches and die plate to perforate the blank.

14. A sales record machine comprising a casing, a platen thereon for supporting sales tickets during manual entry of record items, said casing having chambers therein for blank tickets and recorded tickets, a plurality of punches mounted on the casing to cooperate with the platen, means for actuating the punches to perforate the tickets on the platen, means for feeding the tickets from one chamber across the platen and into the other chamber, and means permitting movement of that portion of the casing carrying the punches whereby to leave the platen exposed to permit manual entry of items on a blank thereon.

15. A sales record machine comprising a casing, a platen thereon for supporting sales tickets during manual entry of record items, means for feeding strips of paper comprising sales tickets in duplicate across the platen, means mounted on said casing for perforating the duplicate tickets in selected areas, and means permitting movement of that portion of the casing carrying the punches whereby to leave the platen exposed to permit manual entry of items on a blank thereon.

16. A sales record machine comprising the combination of a base, a platen thereon for supporting a sales record blank during manual entry of record items and comprising a die, a punch head on the base including a plurality of punches cooperating with the die, means for setting up a predetermined punching condition comprising varying combinations of punches, means mounting the punch head for movement between a position adjacent and cooperating with the die and a position removed therefrom and permitting a manual entry of items on a blank thereon, and means for effecting a relative movement between the punch head and die to punch the blank in a manner corresponding to the said punching condition.

17. A sales record machine comprising a platen for supporting a sales record ticket during manual entry of record items, means for feeding a succession of tickets across the platen, a plurality of punches adjacent the platen, means for setting selected punches for subsequent simultaneous punching action, means for actuating the machine to perforate a ticket, and means permitting movement of that portion of the casing carrying the punches whereby to leave the platen exposed to permit manual entry of items on a blank thereon.

18. A sales record machine comprising a platen for supporting a sales record ticket during manual entry of record items, means for feeding a succession of tickets across the platen, a plurality of punches adjacent the platen, manually operated means for setting selected punches for subsequent action, electrically operated means for setting one of the punches, and means for actuating the machine to perforate a ticket with the set punches.

19. A sales record machine comprising a platen for supporting a sales record ticket during manual entry of record items, means for feeding a succession of tickets across the platen, a plurality of punches adjacent the platen, manually controlled means adjacent the punches for setting selected punches for subsequent action, electrical devices including a remote control for setting one of the punches, and means for actuating the machine to perforate a ticket with the set punches.

20. A sales record machine comprising a casing, a platen for supporting sales tickets in duplicate during manual entry of record items, means for feeding duplicate tickets to the platen and feeding one recorded ticket into the casing and one recorded ticket out of the casing, a plurality of punches, means on the casing for setting up a predetermined punching condition of said punches and indicating selected data written on the ticket, and means operating through the last named means to cause the punches to punch both tickets in selected areas of the autographed body portion thereof to indicate the said data.

21. A sales record machine comprising the combination of a body having a chamber therein, a platen thereon including a die for receiving and supporting a plurality of sales tickets in manifolded relation, a punch head on the body including a plurality of punches cooperating with the die, means for setting up a predetermined punching condition comprising varying combinations of the punches to punch varying desired definite sums and other related data, the arrangement being such that the operator can autographically record a sales transaction on the manifolded sales ticket and then set up the said punching condition to correspond thereto, means whereby the said ticket is then located between the punches and die, means for thereafter effecting a relative movement between the punch head and die to punch the ticket in a manner corresponding to the said punching condition, means for automatically restoring the punch mechanism to normal position after the punching operation, and means for conducting one copy of each completed ticket into the chamber and retaining the same therein.

22. The herein described method of making a combined autographic-punched sales record of each sale in one transaction at the time of making the sale and on the same sales ticket, which consists of providing a continuous strip of independent sales tickets extending over and supported on the platen of an autographic-punching register, writing a sales transaction on one of the tickets in the usual manner while it is thus supported, directly thereafter setting up a punching condition on the said register corresponding to the amount and character of the transaction, and thereafter operating the register to punch the said ticket in accordance with the said condition, the writing and punching being performed by the same clerk at the time of the transaction and while the transaction is fresh in mind, and the punchings being so located as to particularly adapted the ticket to be thereafter mechanically operated upon through such punchings to automatically record or secure data of the sales.

23. The herein described method of making a combined autographic-punched sales record of each sale in one transaction at the time of making the sale and on the same sales ticket, which consists of providing a continuous strip of independent sales tickets extending over and supported on the platen of an autographic-punching register, the supply end of the strip being housed in fan-folded form in a compartment of the register, writing a sales transaction on one of the tickets in the usual manner while it is supported on the platen, directly thereafter setting up a punching condition on the said register corresponding to the amount and character of the transaction, and thereafter operating the register to punch the said ticket in accordance with the said condition in the main autographed body portion thereof with a combination of holes spaced thereover and indicating by their predetermined locations the amount and character of the transaction, the writing and punching being performed by the same clerk at the time of the transaction and while the transaction is fresh in mind, and the punchings being so located as to particularly adapt the ticket to be thereafter mechanically operated upon through such punchings to automatically record or secure data of the sales.

24. The herein described method of making a combined autographic-punched sales record of each sale in one transaction at the time of making the sale and on the same sales ticket, which consists of providing manifolded continuous strips forming independent sales tickets extending over and supported on the platen of an autographic-punching register, writing a sales transaction on one of the tickets in the usual manner while it is thus supported, directly thereafter setting up a punching condition on the said register corresponding to the amount and character of the transaction, and thereafter operating the register to punch the said ticket in accordance with the said condition, the writing and punching being performed by the same clerk at the time of the transaction and while the transaction is fresh in mind, removing the tickets from one strip as they are formed, and retaining in the register the tickets of the other strip, these last named tickets being particularly adapted to be thereafter mechanically operated upon through the said holes therein to automatically record or secure data of the sales.

25. The herein described method of making a combined autographic-punched sales record of each sale in one transaction at the time of making the sale and on the same sales ticket, which consists of providing manifolded continuous strips forming independent sales tickets extending over and supported on the platen of an autographic punching register, the supply end of the strips being housed in fan folded form in a compartment of the register, writing a sales transaction on one of the tickets in the usual manner while it is supported on the platen, directly thereafter setting up a punching condition on the said register corresponding to the amount and character of the transaction, thereafter operating the register to punch the said ticket in accordance with the said condition, the writing and punching being performed by the same clerk at the time of the transaction and while the transaction is fresh in mind, removing the tickets from one strip as they are formed, and receiving and retaining the other strip in fan folded strip form in another compartment, the tickets comprising the last named strip being particularly adapted to be thereafter mechanically operated upon through the said holes therein to automatically record or secure data of the sales.

In testimony whereof, I have hereunto set my hand.

LEONARD W. LANGFORD.